United States Patent
Wallentin et al.

(10) Patent No.: US 12,063,554 B2
(45) Date of Patent: Aug. 13, 2024

(54) USER EQUIPMENT AND METHODS THEREIN FOR PERFORMING HANDOVER

(71) Applicant: Telefonaktiebolaget LM Ericsson (PUBL), Stockholm (SE)

(72) Inventors: Pontus Wallentin, Linköping (SE); Pradeepa Ramachandra, Linköping (SE); Johan Rune, Lidingö (SE); Oscar Ohlsson, Bromma (SE); Claes-Göran Persson, Mjölby (SE); Jens Bergqvist, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 114 days.

(21) Appl. No.: 17/428,358

(22) PCT Filed: Feb. 5, 2020

(86) PCT No.: PCT/SE2020/050108
§ 371 (c)(1),
(2) Date: Aug. 4, 2021

(87) PCT Pub. No.: WO2020/167209
PCT Pub. Date: Aug. 20, 2020

(65) Prior Publication Data
US 2022/0124565 A1 Apr. 21, 2022

Related U.S. Application Data

(60) Provisional application No. 62/805,320, filed on Feb. 14, 2019.

(51) Int. Cl.
*H04W 36/00* (2009.01)
*H04W 76/30* (2018.01)

(52) U.S. Cl.
CPC .... *H04W 36/0011* (2013.01); *H04W 36/0055* (2013.01); *H04W 76/30* (2018.02)

(58) Field of Classification Search
CPC ......... H04W 36/0011; H04W 36/0055; H04W 76/30; H04W 36/005; H04W 36/18
See application file for complete search history.

(56) References Cited

U.S. PATENT DOCUMENTS 9,125,213 B2 * 9/2015 Xu .................. H04W 76/36
9,357,466 B2 * 5/2016 Pani ................ H04L 1/1829
(Continued)

FOREIGN PATENT DOCUMENTS

CN 102348245 A * 2/2012
CN 102917454 A 2/2013
(Continued)

OTHER PUBLICATIONS

PCT Written Opinion of the International Preliminary Examining Authority issued for International application No. PCT/SE2020/050108—Dec. 4, 2020.
(Continued)

*Primary Examiner* — Ahmed Elallam
(74) *Attorney, Agent, or Firm* — Baker Botts L.L.P.

(57) ABSTRACT

A method performed by a User Equipment, UE, to perform handover from a source access node to a target access node is provided. The UE, the source access node and 5 the target access node are operating in a wireless communications network. The UE receives (601) a handover command message from the source access node. The UE establishes (602) a target radio connection with the target access node, and determines (603) whether or not a source cell release criterion is fulfilled. When the source cell release criterion is determined to be fulfilled, the UE releases (604) a source radio 10 connection with the source access node.

9 Claims, 14 Drawing Sheets

Method performed by UE 502

(56) References Cited

U.S. PATENT DOCUMENTS

| | | | | |
|---|---|---|---|---|
| 11,032,750 | B2* | 6/2021 | Kadiri | H04W 36/0033 |
| 11,252,615 | B2* | 2/2022 | Jin | H04W 36/0069 |
| 11,490,304 | B2* | 11/2022 | Wu | H04W 36/00837 |
| 2009/0185539 | A1* | 7/2009 | Ohta | H04W 36/02 370/331 |
| 2015/0319774 | A1 | 11/2015 | Cai et al. | |
| 2016/0197781 | A1 | 7/2016 | Smith | |
| 2018/0227805 | A1 | 8/2018 | Jang et al. | |
| 2018/0227819 | A1 | 8/2018 | Lee et al. | |
| 2019/0268818 | A1 | 8/2019 | Yi et al. | |
| 2020/0120548 | A1* | 4/2020 | Jin | H04W 36/0069 |
| 2020/0323018 | A1* | 10/2020 | Chen | H04W 76/30 |
| 2021/0195682 | A1* | 6/2021 | Lu | H04W 76/38 |

FOREIGN PATENT DOCUMENTS

| | | | | |
|---|---|---|---|---|
| CN | 104640163 | A | | 5/2015 |
| CN | 106465167 | A | | 2/2017 |
| CN | 107371208 | A * | 11/2017 | H04W 36/0016 |
| EP | 3 634 036 | A1 | | 4/2020 |
| WO | 2014 121503 | A1 | | 8/2014 |
| WO | 2017 138978 | A1 | | 8/2017 |
| WO | 2018 079998 | A1 | | 5/2018 |
| WO | 2018 228126 | A1 | | 12/2018 |

OTHER PUBLICATIONS

Japanese Office Action issued for Application No. 2021-538072—Jul. 1, 2022.

3GPP TR 36.881 v14.0.0; Technical Report; 3rd Generation Partnership Project; Technical Specification Group Radio Access Network; Evolved Universal Terrestrial Radio Access (E-UTRA); Study on latency reduction techniques for LTE (Release 14)—Jun. 2016.

3GPP TS 36.300 v14.8.0; Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)—Sep. 2018.

3GPP TS 36.331 v14.9.0; Technical Specification; 3rd Generation Partnership Project; Technical Specification Group Radio Access Network; Evolved Universal Terrestrial Radio Access (E-UTRA); Radio Resource Control (RRC); Protocol specification (Release 14)—Dec. 2018.

PCT International Search Report issued for International application No. PCT/SE2020/050108—Apr. 23, 2020.

PCT Written Opinion of the International Searching Authority issued for International application No. PCT/SE2020/050108—Apr. 23, 2020.

Office Action issued for Chinese Application Serial No. 202080014330.X—Dec. 2, 2023.

Search Report issued for Chinese Application Serial No. 202080014330X—Nov. 27, 2023.

* cited by examiner

Fig. 6 Method performed by UE 502

USER EQUIPMENT AND METHODS THEREIN FOR PERFORMING HANDOVER

PRIORITY

This nonprovisional application is a U.S. National Stage Filing under 35 U.S.C. § 371 of International Patent Application Serial No. PCT/SE2020/050108 filed Feb. 5, 2020 and entitled "A User Equipment and Methods Therein for Performing Handover" which claims priority to U.S. Provisional Patent Application No. 62/805,320 filed Feb. 14, 2019, both of which are hereby incorporated by reference in their entirety.

TECHNICAL FIELD

Embodiments herein relate to a User Equipment (UE), and a method therein. In particular, they relate to performing handover from a source access node to a target access node in a wireless communications network.

BACKGROUND

In a typical wireless communication network, wireless devices, also known as wireless communication devices, mobile stations, stations (STA) and/or User Equipments (UE), communicate via a Local Area Network (LAN) such as a WiFi network or a Radio Access Network (RAN) to one or more Core Networks (CN). The RAN covers a geographical area which is divided into service areas or cell areas, which may also be referred to as a beam or a beam group, with each service area or cell area being served by a radio network node such as a radio access node e.g., a W-Fi access point or a Radio Base Station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

Wireless Communication Systems in 3GPP

FIG. 1 schematically illustrates a simplified wireless communication system comprising a UE 102 which communicates with one or multiple access nodes 103-104 using radio connections 107-108. The access nodes 103-104 are connected to a network node 106. The access nodes 103-104 are part of a radio access network 100.

For wireless communication systems pursuant to 3GPP Evolved Packet System, EPS, also referred to as Long Term Evolution, LTE, or 4G, standard specifications, such as specified in the 3GPP standard document TS 36.300 v15.4.0 and related specifications, the access nodes 103-104 correspond typically to Evolved NodeBs (eNBs) and the network node 106 corresponds typically to either a Mobility Management Entity (MME) and/or a Serving Gateway (SGW). The eNBs are part of the radio access network 100, which in this case is the E-UTRAN (Evolved Universal Terrestrial Radio Access Network), while the MME and SGW are both part of the EPC (Evolved Packet Core network).

For wireless communication systems pursuant to the 3GPP 5G System (5GS), also referred to as New Radio (NR) or 5G, standard specifications, such as specified in 3GPP TS 38.300 and related specifications, on the other hand, the access nodes 103-104 correspond typically to an 5G NodeB (gNB) and the network node 106 corresponds typically to either a Access and Mobility Management Function (AMF) and/or a User Plane Function (UPF). The gNB is part of the radio access network 100, which in this case is the NG-RAN (Next Generation Radio Access Network), while the AMF and UPF are both part of the 5G Core Network (5GC).

Mobility in RRC_CONNECTED in LTE and NR

Mobility in RRC_CONNECTED state is also known as handover. The purpose of handover is to move the UE 102, due to e.g. mobility, from a source access node 103, using a source radio connection 107, to a target access node 104, using a target radio connection 108. The source radio connection 107 is associated with a source cell controlled by the source access node 103. The target radio connection 107 is associated with a target cell controlled by the target access node 103. So in other words, during a handover, the UE 102 moves from the source cell to a target cell.

In some cases, the source access node 103 and target access node 104 are different nodes, such as different eNBs or gNBs. There cases are referred to as inter-node handover, inter-eNB handover or inter-gNB handover. In other cases, the source access node 103 and target access node 104 are the same node, such as the same eNB and gNB. These cases are referred to as intra-node handover, intra-eNB handover or intra-gNB handover and cover the case when the source and target cells are controlled by the same access node. In yet other cases, the handover is performed within the same cell, and thus also within the same access node controlling that cell,—these cases are also referred to as intra-cell handover.

It should therefore be understood that the source access node 103 and target access node 104 refer to a role served by a given access node during a handover of a specific UE. For example, a given access node may serve as source access node during handover of one UE, while it also serves as the target access node during handover of a different UE. And, in case of an intra-node or intra-cell handover of a given UE, the same access node serves both as the source access node and target access node for that UE.

A UE in RRC_CONNECTED state may be configured by the network to perform measurements of the serving and neighbour cells and based on the measurement reports sent by the UE, the network may decide to perform a handover of the UE to a neighbour cell. The network then sends a Handover Command message to the UE (in LTE an RRC-ConnectionReconfiguration message with a field called mobilityControlInformation and in NR an RRCReconfiguration message with a reconfigurationWithSync field).

The reconfiguration of the UE is prepared by the target access node upon a request from the source access node (Handover Request message sent over X2 interface in case of EUTRA-EPC or Xn interface in case of EUTRA-5GC or NR) and takes into account the existing RRC configuration the UE has in the source cell (which is provided to the target access node in the Handover Request message). The reconfiguration parameters provided by the target access node (such as a target eNB/gNB), contains, for example, information needed by the UE to access the target cell, e.g., random access configuration, a new C-RNTI assigned by the target access node and security parameters enabling the UE to calculate new security keys associated to the target cell so that the UE 502 may send a Handover Complete message on Signalling Radio Bearers (SRB)1, encrypted and integrity protected, based on new security keys upon accessing the target access node.

FIGS. 2 a, b and c summarize the signalling flow between the UE 102, the source access node 103 (also known as source gNB or source cell) and the target access node 104 (also known as target gNB or target cell) during a handover procedure, using 5G/NR as example. FIG. 2a depicts the of the handover preparation a handover procedure, FIG. 2b depicts the handover execution of the a handover procedure, and FIG. 2c depicts the handover completion of the a handover procedure.

Although the signalling flows in FIGS. 2a, b and c show a handover scenario in 5G/NR, there are some general and common principles for UEs performing handover (or in more general terms, mobility in RRC_CONNECTED) in LTE and NR:

Mobility in RRC_CONNECTED is Network-controlled as the network has best info regarding current situation such as load conditions, resources in different nodes, available frequencies, etc. Network may also take into account the impact from other UEs served by the network, e.g. from a resource allocation perspective. The Access and Mobility management Function (AMF) may provide the access nodes, such as eNBs and gNBs, with mobility-control information, as in action 0 in FIG. 2a.

The Network prepares a target access node 104 before the UE accesses that node. Source access node 103 provides the UE with the RRC configuration to be used in the target access node 104, including SRB1 configuration to be used when the UE sends the HO Complete message, also known as the RRCConnectionReconfigurationComplete message in LTE, on the target radio connection 108 to the target access node 104.

A new C-RNTI is allocated by the target access node 104 and provided to the UE 102 in the Handover Command message sent on the source radio connection 107 from the source access node 103. The UE 102 identifies itself by conveying the C-RNTI in Message (MSG)3 in the handover (HO) Complete message. Hence, there is no need for UE context fetching in the target node, unless a failure occurs.

To speed up the handover, the source access node 103 provides the UE 102 with information how to access the target access node 104 e.g. RACH configuration, so the UE does not have to acquire SI prior to the handover.

The UE may be provided with Contention-Free Random Access (CFRA) resources, i.e. in that case the target access node 104 identifies the UE 102 from the preamble in MSG1. The principle is that the handover procedure may always be optimized with network pre-allocated resources.

Security is prepared before the UE 102 accesses the target access node 104 i.e. keys must be refreshed before sending the encrypted and integrity protected HO Complete message so the UE 102 may be verified to the target access node 104.

Both full and delta reconfiguration are supported so that the HO command may be minimized.

Radio Link Monitoring (RLM) in LTE and NR

Radio Link Monitoring (RLM) is a procedure in RRC_CONNECTED to keep track of the radio link condition so that appropriate actions can be taken if Radio Link Failure (RLF) is declared.

In one example of the radio link monitoring procedure, this main principle is used in both LTE and NR, the physical layer in the UE continuously monitors the, e.g. downlink, quality of received signals from the access node and at a certain criterion, the physical layer provides an "out-of-sync" indication to the RRC layer in the UE.

Upon a certain number of (known as the parameter N310) consecutive "out-of-sync" indications, the RRC layer starts a timer (known as T310). If the physical layer then provides a certain number of "in-sync" indications while this timer is running, the UE has recovered from a sync problem and stops the timer. If the timer expires, this triggers a radio link failure (RLF) condition, which typically leads to an RRC connection re-establishment.

Mobility Enhancements for LTE and NR and Make-Before-Break

Two new work items for mobility enhancements in LTE and NR have started in 3GPP in release 16. The main objectives of the work items are to improve the robustness at handover and to decrease the interruption time at handover.

Handover interruption time is typically defined as the time from the UE stops transmission/reception with the source access node 103 (eNB/gNB) until the target access node 104 (eNB/gNB) resumes transmission/reception with the UE.

In LTE pre-Release 14, according to 3GPP TR 36.881 v15.4.0, the handover interruption time is at least 45 ms. In LTE and NR, different solutions to decrease the handover interruption time have since then been discussed. Improvements are driven for example by new service requirements on low latency, e.g. aerial, industrial automation, industrial control, for which low interruption time shall be guaranteed.

As an example of one such improvement, Make-Before-Break (MBB) was introduced in LTE Release14 in purpose to shorten handover interruption time as close to zero (0) ms as possible. FIG. 3 schematically illustrates the signalling in relation to MBB in the LTE Release 14. User data to and/or from old cell stops at 301, and User data to and/or from new cell starts from 302.

The MBB as specified in LTE Release 14, 3GPP TS 36.300 v14.8.0 and TS 36.331 v14.9.0, has some known limitations:

- The source radio connection 107 to the source access node 103 is only maintained until the UE executes initial uplink transmission in the target access node 104, i.e. the UE releases the source radio connection 107 to the source access node 103 before the target radio connection 108 to the target access node 104 is ready for packet transmission/reception.
- 3GPP TS 36.300 and TS 36.331 do not clearly specify when the UE 102 can switch from Source access node 103 to Target access node 104 for DL/UL data transfer.
- It is designed for UEs with single Transmission/Reception (Tx/Rx) radio chain. Such a UE can typically not maintain simultaneous DL/UL data transfer with Source access node and at the same time switch from Source access node 103 to Target access node 104 without any user plane interruption.
- There is no clear mechanism defined for how long the source access node 103 will continue to transfer DL data during HO execution. In worst case the Source access node 103 will continue to transfer DL data to the UE 102 until it receives the UE Context Release message in step 17 in FIG. 3.
- How DL Data transfer can be handled without interruption, & reliably, during PDCP Anchor switch from Source access node 103 to Target access node 104 is not specified.
- HO reliability & robustness enhancements are not considered.
- It is limited to intra-frequency, synchronous and same bandwidth carrier frequency for both source access node 103 and target access node 104.

Improvements to the LTE Release 14 make-before-break handover have been proposed in the past, Some of these improvements would benefit from UEs with dual Tx/Rx radio chain, such a UE has dual radio transmitters and receivers and associated dual user plane protocol stacks. One example of such proposed MMB handover improvement for LTE is shown in FIGS. 4a and 4b.

Some highlights in this solution are:

- At action 7, upon receiving the 'make-before-break' HO indication in the RRC Connection Reconfiguration Request message, the UE 102 maintains the source radio connection 107 to the source access node 103 even while establishing the target radio connection 108 to the target access node 104. That is, the UE 102 can send and receive data via the source access node 103 between action 7-10 without any interruption. And after action 10, UE has the target link available for data Tx/Rx similar to the regular HO procedure.
- Once the connection setup with the target access node is successful, i.e. after sending the RRC Connection Reconfiguration Complete message in action 10, the UE 102 maintains one common PDCP entity but keeps dual RLC/MAC/PHY stacks, one for the source access node 103 link and one for the target access node 104 link. After action 10, the UE 102 transmits the UL data on the target access node 104 similar to the regular HO procedures using the target access node 104 security keys. There is no need for UL data duplication to both nodes and it avoids UE Power splitting between 2 nodes and also simplifies UE implementation.
- After, i.e. thereafter, the UE 102 sends the RRC Connection Reconfiguration Complete message, the target access node 104 will send X2 data forwarding indication (action 11) to the source access node 103 and the Source access node PDCP PDUs will be duplicated towards the Target access node 104 (via X2 UP). The target access node PDCP will encrypt data received from Source access node 103. The UE 102 can then receive DL data from both the source and target access nodes simultaneously before the source access node 103 connection is released. Optionally, based on network implementation, duplicating DL data transmission, i.e. sending the same PDCP PDUs from both nodes, during HO execution provides helps to reduce DL data interruption during HO execution. This is also helpful for additional link reliability and reduces latency of DL data delivery, i.e. when one link is poor and without waiting for re-transmission delay, the other link can deliver the same data faster without re-transmission.
- The UE 102 needs to maintain the security context for both source access node 103 and target access node 104 until the source access node release request is received. the UE 102 can differentiate the security key to be used for a PDCP PDU based on the RLC/MAC/PHY stack from which the PDU is received.
- the UE 102 releases the source radio connection 107 with the source access node 103 as per the notification from the target access node 104 (action 17a).

SUMMARY

As a part of developing embodiments herein a problem will first be identified and discussed. In the existing solutions, for example in the enhanced make-before-break solution as illustrated in FIGS. 4a and b above, the UE 102 needs to maintain the source radio connection 107 to the source access node 103 until an explicit "release source cell stack" indication in message 17a is received. This has the following drawback. Since the target access node 104 needs to send an explicit release request message to the UE 102 for release of the source access node 103, the UE needs to keep the connection to the source access node 103 longer than really necessary, resulting in higher usage of radio resources, memory, processor and power consumption in both network and UE.

An object of embodiments herein is to provide an improved release of the source cell at handover whereby the performance of a wireless communications network is improved.

According to an aspect of embodiments herein, the object is achieved by a method performed by a User Equipment, UE, to perform handover from a source access node to a target access node. The UE, the source access node and the target access node are operating in a wireless communications network. The UE receives a handover command message from the source access node. The UE establishes a target radio connection with the target access node, and determines whether or not a source cell release criterion is fulfilled. When the source cell release criterion is determined to be fulfilled, the UE releases a source radio connection with the source access node.

According to another aspect of embodiments, the object is achieved by a User Equipment, UE, adapted to perform handover from a source access node to a target access node. The UE, the source access node and the target access node are operating in a wireless communications network. The UE comprises:

A receiving unit adapted to receive a handover command message from the source access node;

an establishing unit adapted to establish a target radio connection with the target access node;

a determining unit adapted to determine whether or not a source cell release criterion is fulfilled; and a releasing unit adapted to when the source cell release criterion is determined to be fulfilled, release a source radio connection with the source access node.

In this way a faster resumption of SCG is provided as the UE does not need to send measurement reports. Further, appropriate SCG configurations are provided.

BRIEF DESCRIPTION OF THE DRAWINGS

Examples of embodiments herein are described in more detail with reference to attached drawings in which.

DETAILED DESCRIPTION

In some embodiments disclosed herein, when a UE has established a radio connection to a target access node, it detects whether or not a source cell release criterion is fulfilled. When the source cell release criterion is fulfilled, the UE releases s source radio connection with a source access node. Some examples of the source cell release criterion are:

When the UE has received the first valid data packet from the target access node, the source cell release criterion is fulfilled.

When a Radio Link Monitoring (RLM) on the source radio connection with the source access node triggers a radio link failure condition on the source radio connection, the source cell release criterion is fulfilled.

When one of the events above is triggered, instead of that the source cell release criterion is immediately fulfilled, the UE starts a timer. When this timer expires the source cell release criterion is fulfilled.

When the UE receives a certain message from the source access node or the target access node, the source cell release criterion is fulfilled.

If the network sends a message to the UE that it shall release the source radio connection from source access node, UE releases the source radio connection 107 even if the timer is running.

It should be understood that one or more features from one or more exemplifying embodiments described herein may be combined.

Embodiments herein may refer to Handover, RRC_CONNECTED, Make-before-break, Radio Link Monitoring, PDCP, release of source cell at handover.

An advantage of embodiments disclosed herein is that they make it possible for the UE to release the source radio connection from the source access node earlier as compared to the prior art solutions. This results in lower usage of radio resources and lower power consumption in both the network and the UE. It also enables the source access node to release the information about the UE earlier, and as a result free up resources (such as memory, identifiers and processing).

A zero (0) ms handover interruption time for both UL and DL may be achieved since the UE keeps the source radio connection with the source access node until it has successfully accessed the target access node.

Embodiments herein do not prevent the UE to return to the source access node during a period where it maintains connections to both source and target access nodes, neither do they prevent the network from explicitly releasing the source radio connection when so decided by the network.

Figure 1:
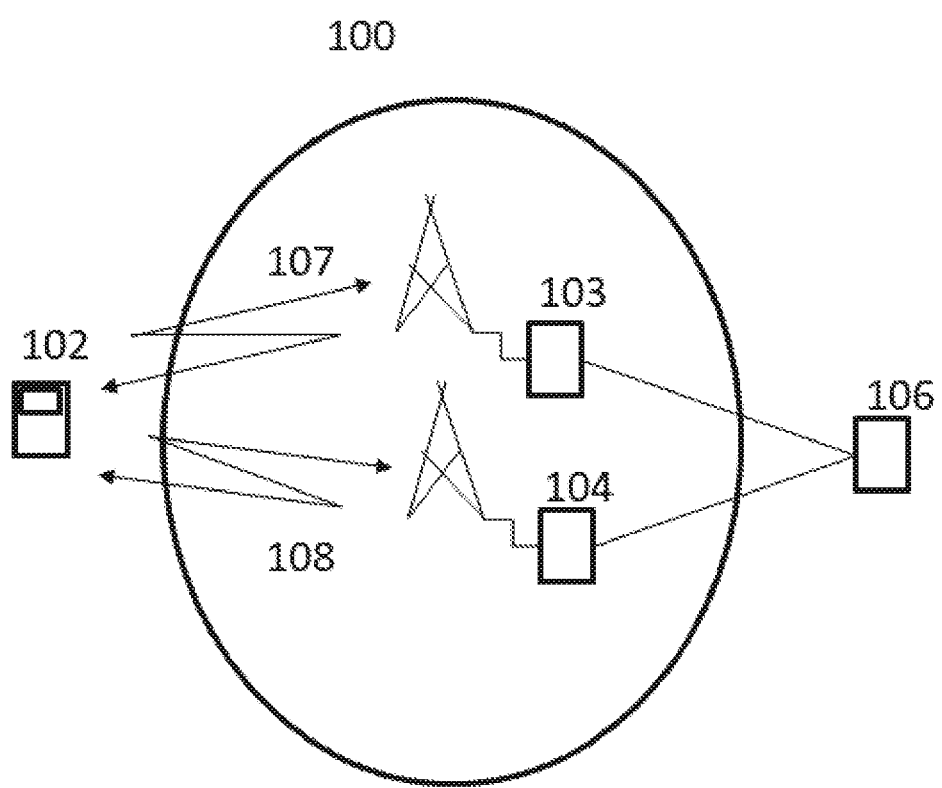
FIG. 1 is a schematic block diagram illustrating prior art.
Figure 2A:
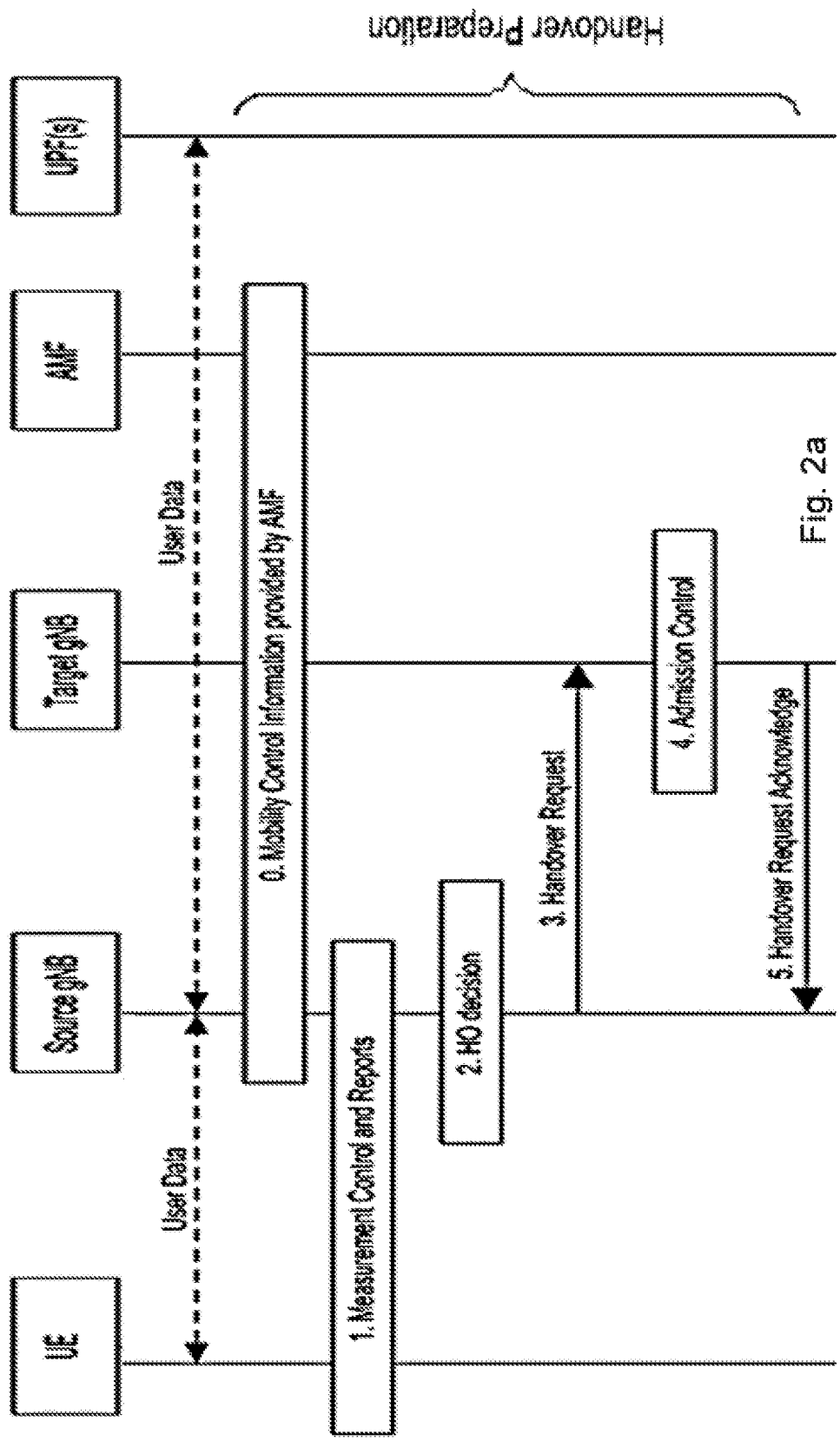
FIGS. 2 a, b, and c are schematic sequence diagrams illustrating prior art.
Figure 2B:
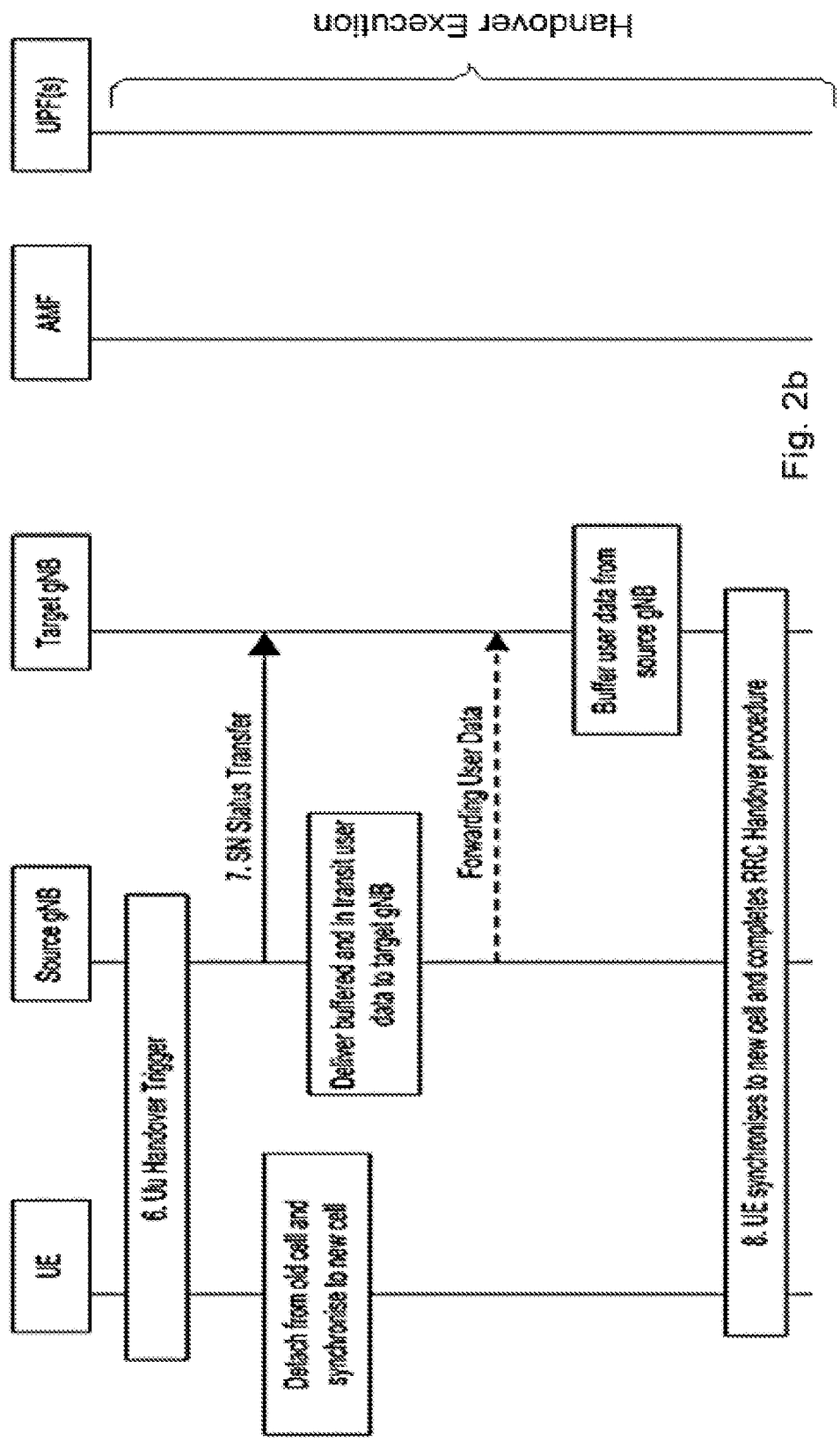
Figure 2C:
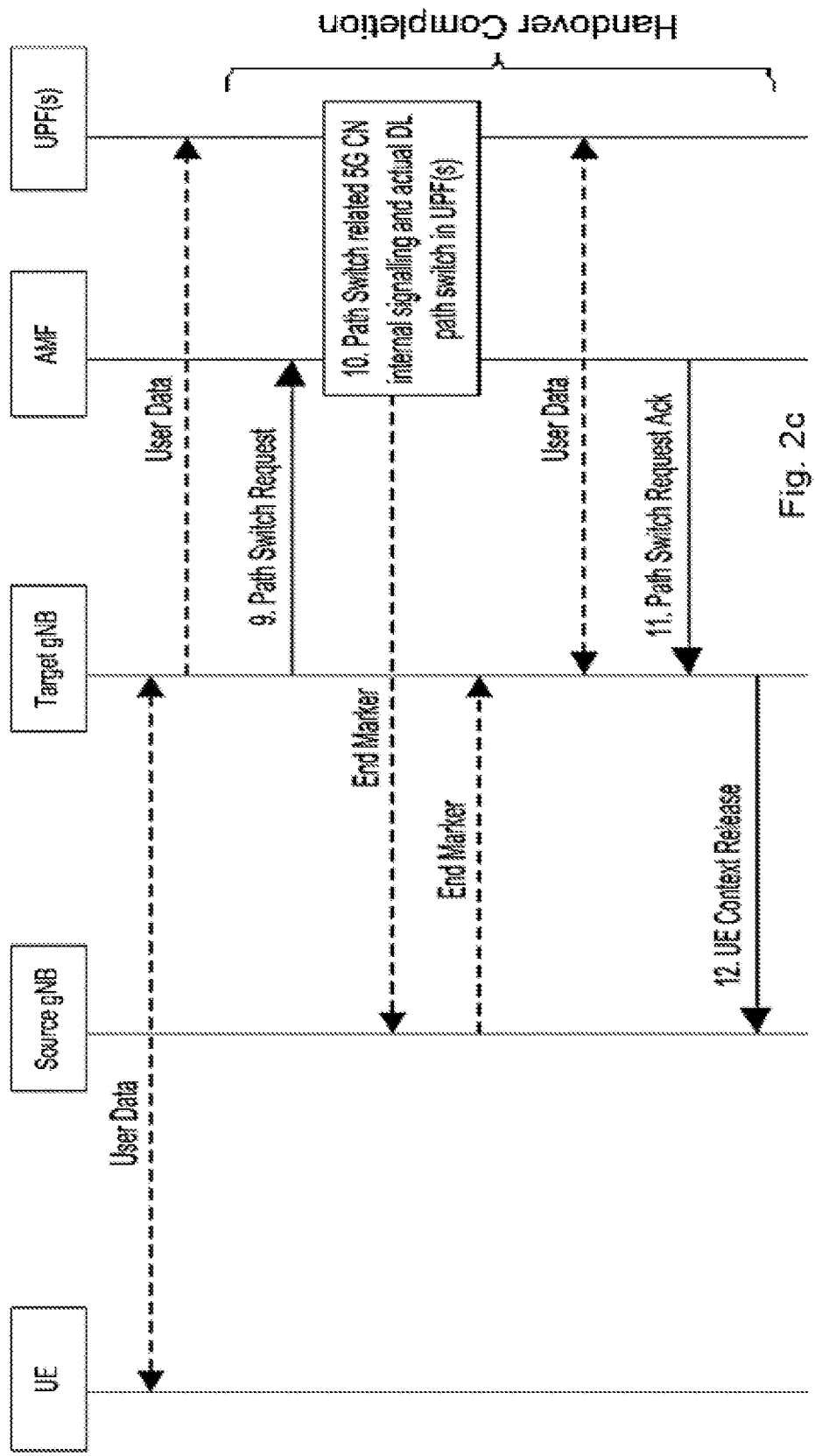
Figure 3:
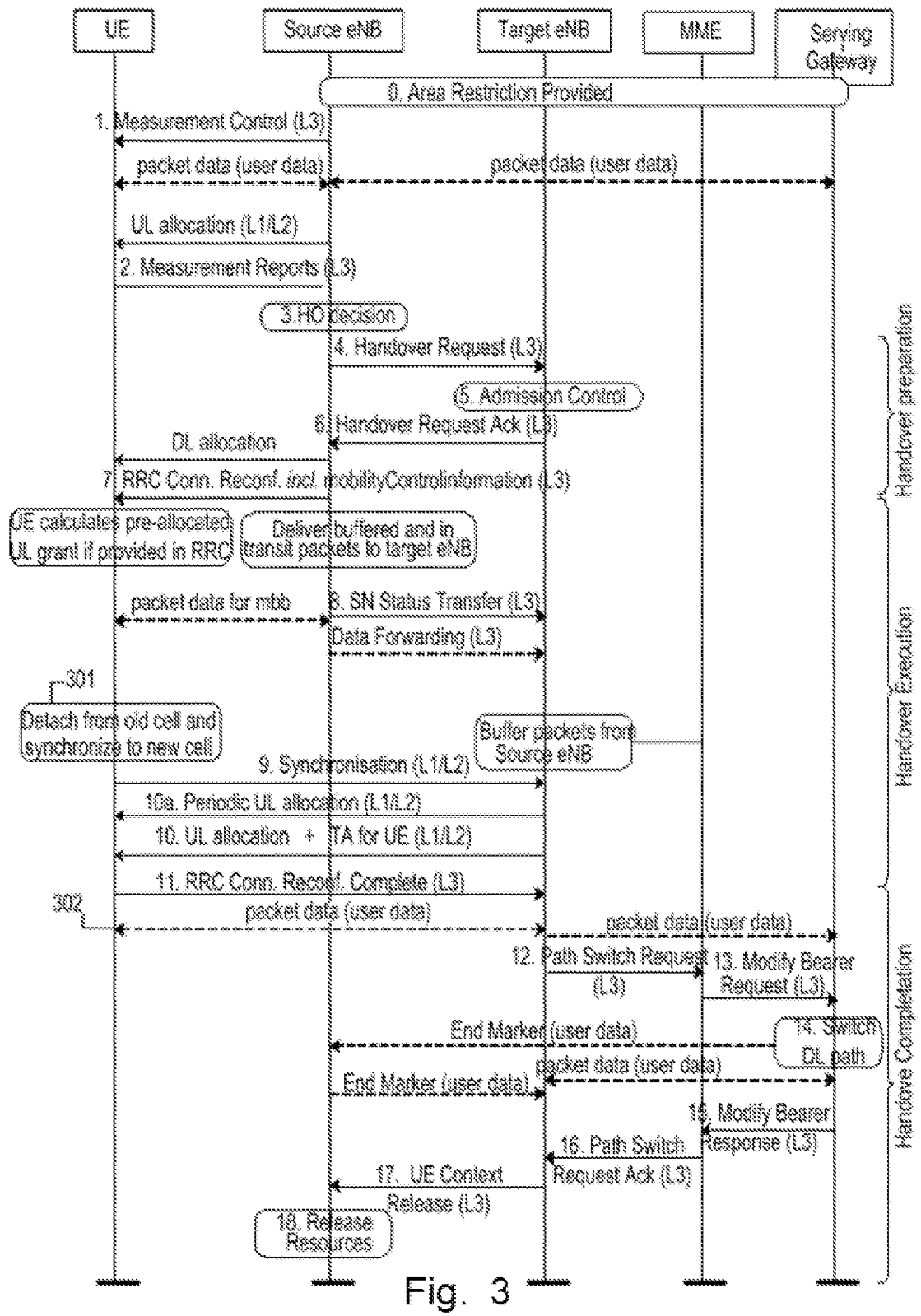
FIG. 3 is a schematic sequence diagram illustrating prior art.
Figure 4A:
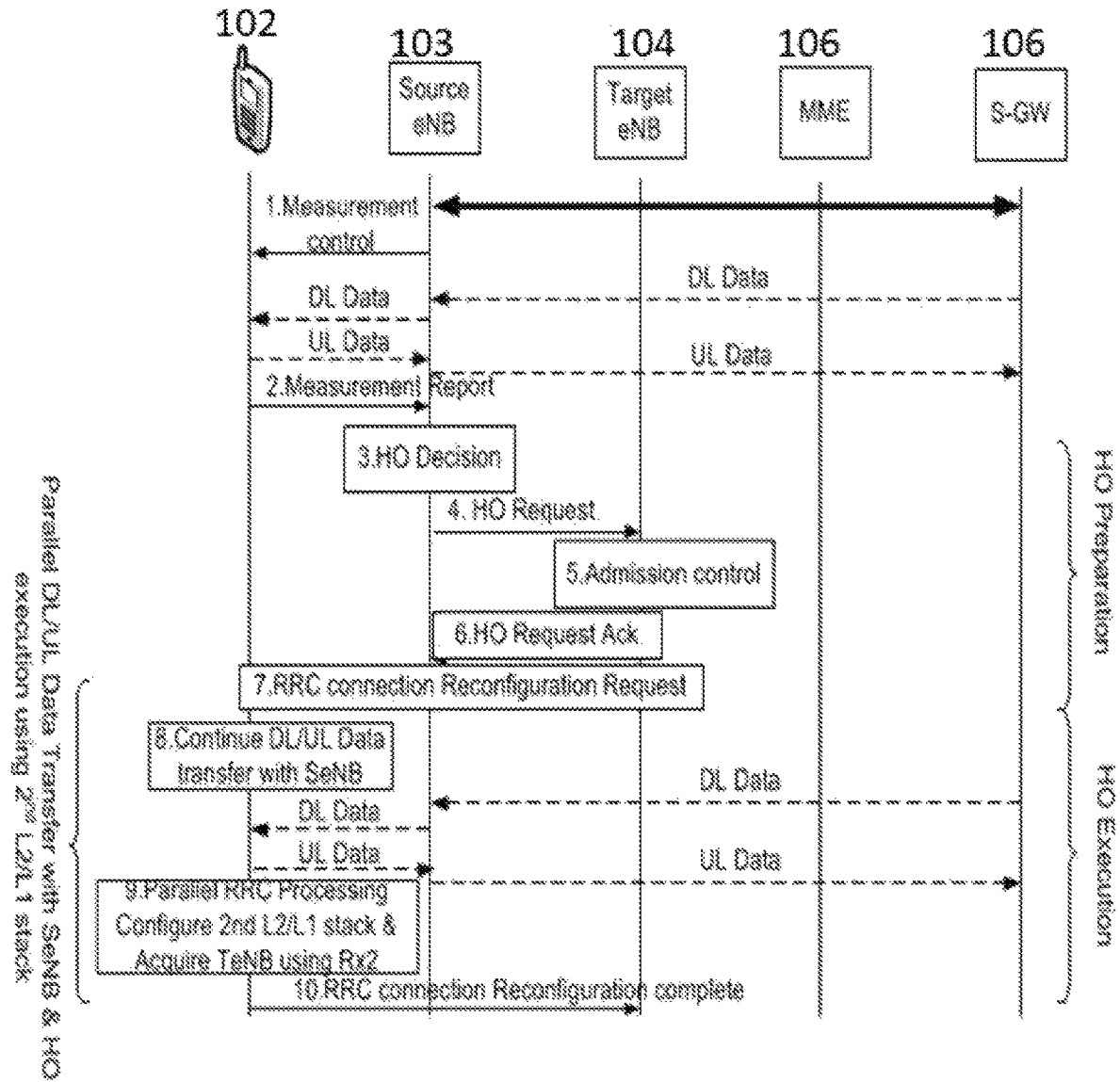
FIGS. 4 a and b are combined flowcharts and sequence diagrams illustrating prior art.
Figure 4B:
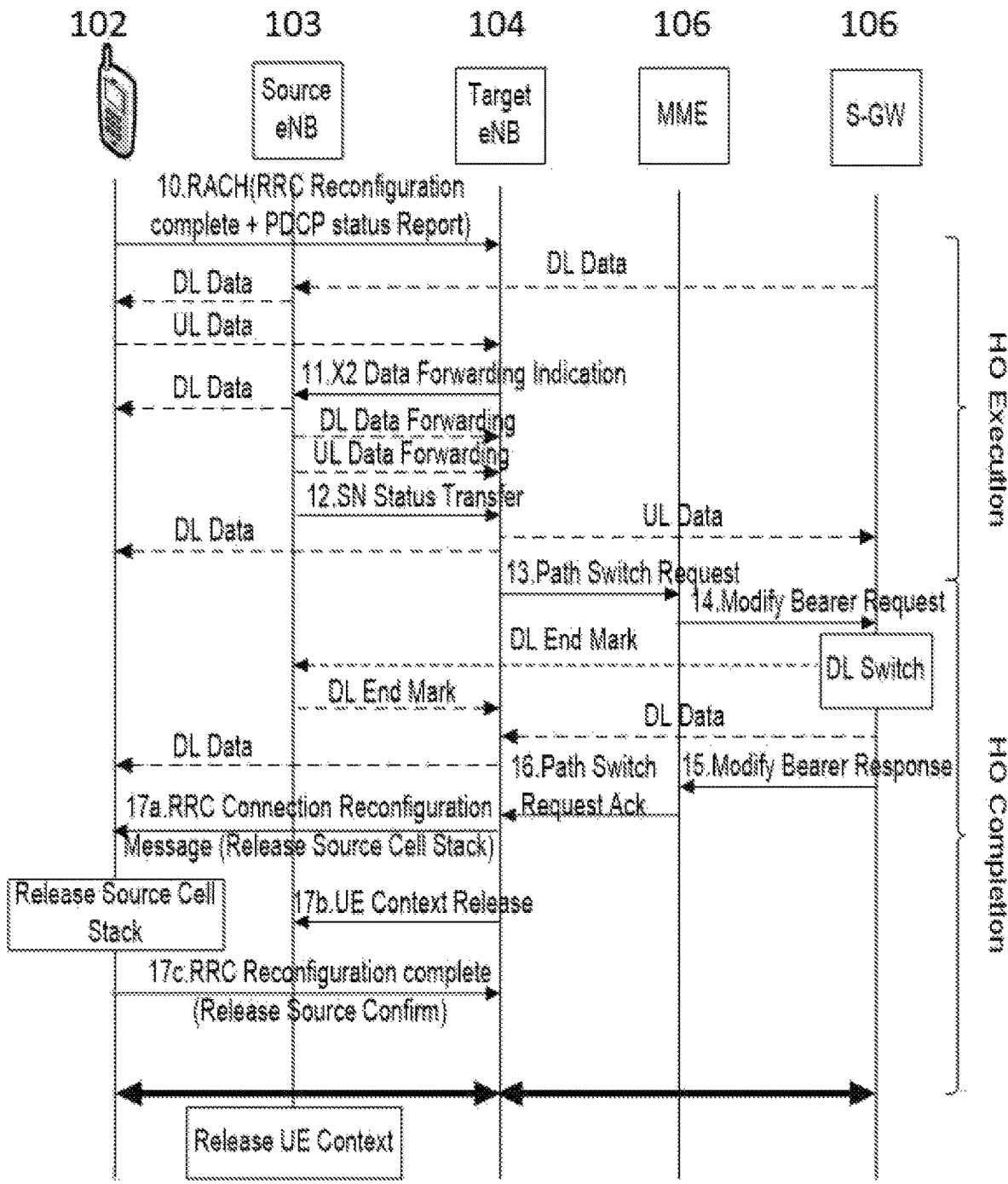
Figure 5:
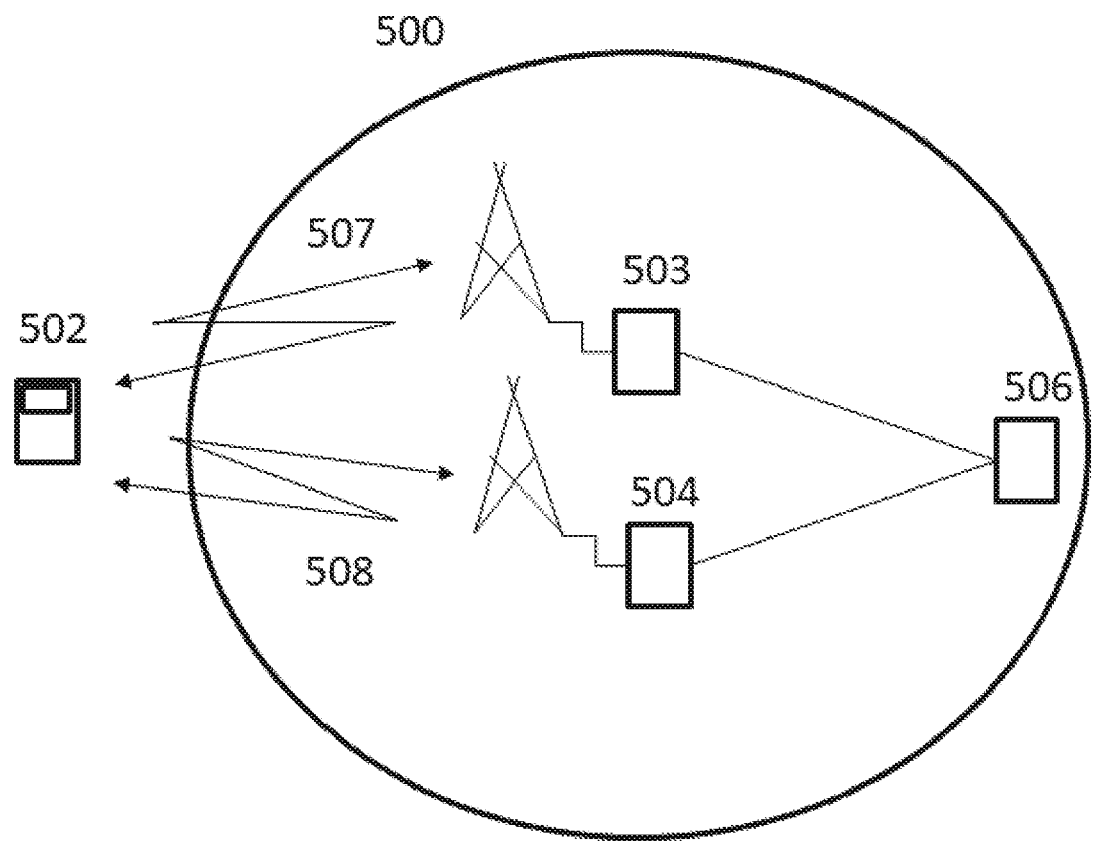
FIG. 5 is a schematic block diagram illustrating embodiments of a wireless communications network.

Embodiments herein relate to wireless communication networks in general. FIG. 5 is a schematic overview depicting a wireless communications network 500. The wireless communications network 500 may be referred to as a radio communications network. The wireless communications network 500 comprises one or more Radio Access Networks (RANs) and one or more Core Networks (CNs). The radio communications network 500 may use a number of different Radio Access Technologies (RATs), such as NB-IoT, CAT-M, Wi-Fi, eMTC, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Sometimes in this disclosure the wireless communications network 500 is referred to as just a network.

Wireless devices e.g. a wireless device 502 also referred to as a UE 502, is operating in the wireless communications network 500. As schematically illustrated in FIG. 5, the UE 502 may communicate with one or more access nodes, such as a first access node 503 and a second access node 504, operating in the communications network 500.

The wireless device 502 may e.g. be a mobile station, a non-Access Point (non-AP) STA, a STA, a user equipment (UE) and/or a wireless terminals, an NB-IoT device, an eMTC device, Integrated Access Backhaul (IAB) node and a CAT-M device, a WiFi device, an LTE device and an NR device communicate via one or more Access Networks (AN), e.g. RAN, to one or more Core Networks (CN). It should be understood by the skilled in the art that "wireless device" is a non-limiting term which means any terminal, wireless communication terminal, user equipment, Device to Device (D2D) terminal, or node e.g. smart phone, laptop, mobile phone, sensor, relay, mobile tablets or even a small base station communicating within a cell.

In this disclosure, the terms wireless device, terminal and UE are used interchangeably.

The UE 502 may communicate with first access node 503 in a connection 507 and with the second access node 504 over a connection 508.

As previously mentioned, the access nodes 503, 504 operate in the radio communications network 500, and may be referred to as Radio Network Node (RNNs). The access nodes 503, 504 provide radio coverage over a respective geographical area, e.g. a respective service area, which may also be referred to as cells, beams or beam groups of a first Radio Access Technology (RAT), or a second RAT. The first and second RATs may be different RATs such as one of the RATs is a NR, 5G, LTE, NB-IoT, CAT-M, Wi-Fi, eMTC or similar, and the other RAT is another one of the NR, 5G, LTE, Wi-Fi, NB-IoT, CAT-M, Wi-Fi, eMTC or similar. The access node 503, 504 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a Next Generation Radio Access Network eNB (NG-RAN eNB, ng-eNB), a gNB, a base transceiver station, a radio remote unit, an Access Point Base Station, a base station router, a transmission arrangement of a radio base station, a stand-alone access point or any other network unit capable of communicating with a wireless device within the service area served by the access node 503, 504 depending e.g. on the radio access technology and terminology used. The access node 503, 504 may be referred to as a serving radio network node and communicates with the wireless device 502 with Downlink (DL) transmissions to the wireless device 502 and Uplink (UL) transmissions from the wireless device 502.

Further network nodes may operate in the radio communications network 500, such as a network node 506. The network node 506 may be a Mobility Network Node (MNN), a Mobility Management Entity (MME) which is a control node for an EPS access network, a Serving Gateway (SGW), and a Packet Data Network Gateway (PGW). An MME is amongst other responsible for tracking and paging procedure including retransmissions. Further the network node 506 may be an Access and Mobility Management Function (AMF) which is a control node for a 5GS access network, and a user plane function (UPF). Further, the network node 506 may be an Operation And Maintenance (OAM) node such as an Operation and Support System Radio and Core (OSS-RC) node or an Ericsson Network Management (ENM) node.

One or more actions of methods according to embodiments herein may be performed by the UE 502 and/or by the access nodes 503,504 and/or by the network node 506. As an alternative, a Distributed Node (DN) and functionality, e.g. comprised in a cloud may be used for performing or partly performing the methods.

Actions of Some Embodiments Herein

Figure 6:
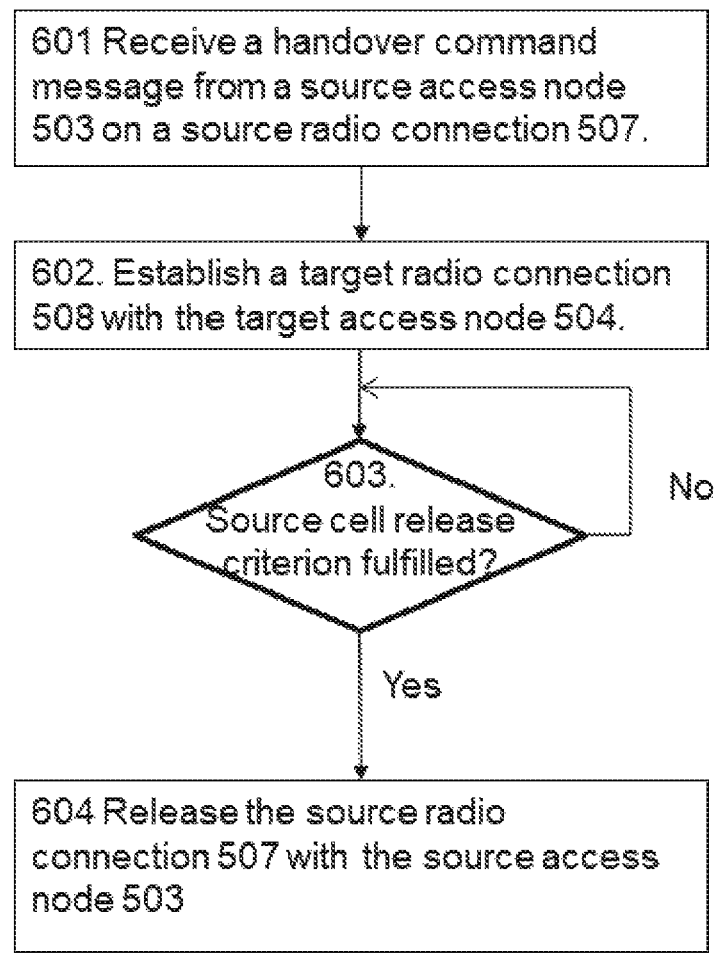
FIG. 6 is a flowchart depicting embodiments of a method in a UE.

Example embodiments of a flowchart depicting embodiments of a method performed by the UE 502, e.g. to perform handover from the source access node 503 to the target access node 504, is depicted in FIG. 6 and will be described more in detail in the following. The UE 502, the source access node 503 and the target access node 504 are operating in the wireless communications network 500. The method may comprise one or more of the following actions which actions may be taken in any suitable order. Further, it should be understood that one or more actions may be optional and that actions may be combined.

Sometimes in this disclosure reference is made to a timer. It should be understood that by such a reference is meant a time period, and the terms may be used interchangeably. For example, a time period may be set and when the time period has lapsed or expired, the timer may be said to have expired.

Action 601

The UE 502 receives a handover command message from the source access node 503. In some embodiments, the handover command message may be an RRCConnectionReconfiguration message. The handover command message may be received on the source radio connection 507 from the source access node 503. A source radio connection when used herein means a radio connection between a UE and a source access node. The handover command message instructs the UE 502 to perform a handover to a target cell 504. The message may comprise information about radio resources, such as frequency and other parameters, in order to connect to the target access node 504. The message may also comprise information to instruct the UE 502 of the type of handover to be performed. For example, the message may comprise an enhanced make-before-break indicator. The message may also comprise information about which source cell release criterion to be used by the UE 502 and/or about optionally parameters to be used as input to the source cell release criterion such as timer value(s).

In some embodiments, the UE 502 starts a timer, e.g. a time period, upon reception of the handover command message from the source access node 503. The timer may e.g. be used as a supervision of that the source cell is released also when no other source cell release criteria are fulfilled and thus the timer may be used in combination with other source cell release criteria. The source cell release criterion may e.g. be determined to be fulfilled upon expiry of the timer, e.g. upon expiry or lapse of the time period.

Action 602

The UE 502 establishes a target radio connection 508 with the target access node 504. A target radio connection when used herein means a radio connection between a UE a and a target access node. In an example, an enhanced make-before-break handover is performed, e.g. as response to an enhanced make-before-break indicator comprised in the command message received in action 601. Therefore, the UE 502 keeps the source radio connection 507 with the source access node 503 during execution of the handover. The procedure to establish a target radio connection 508 may comprise a random access procedure, depending on which type of radio resources that are provided in the handover command message.

Action 603

The UE 502 checks whether or not a source cell release criterion is fulfilled. Some examples of source cell release criteria are provided below. If the criterion is not fulfilled, the UE 502 may continuously or regularly perform a recheck, until the criterion is fulfilled.

The UE 502 determines whether or not a source cell release criterion is fulfilled. The UE 502 may use information provided in the received handover command message in action 601 to determine whether the source cell release criterion is fulfilled and/or to select which source cell release criterion that should be used among a given set of source cell release criteria.

The source cell release criterion may be determined to be fulfilled when one or more out of the following actions has been performed:

when the UE 502 receives a first data packet from the target access node 504 on the target radio connection 508;

when the UE 502 performing a Radio Link Monitoring, RLM, on the source radio connection 507 with the source access node 503 detects a condition, e.g. a radio link failure, on the source radio connection 507;

when the UE 502 receives a message from either the source access node 503 or the target access node 504, which message instructs or triggers the UE 502 to release the source radio connection 507 with the source access node 503; and/or when the UE 502 receives confirmation from the target access node 504 about successful reception of an uplink transmission performed in the target cell.

Action 604

When the UE 502 has determined that the source cell release criterion is fulfilled, the UE 502 releases the source radio connection 507 with the source access node 503. Further, the UE 502 may release one or more associated radio resources. The source access node 503 may now release any information about the UE 502 also known as a UE context, as a response to either detecting that the UE 502 released the source radio connection 507 from the source access node 503, or as response to the reception of a message from the target access node 504.

The UE 502 may in some embodiments receive configuration data from the source access node 503. The configuration data instructs the UE 502 to apply one source cell release criterion out of a set of possible source cell release criteria or to apply a subset of source cell release criteria out of the set of possible criteria for triggering release of the source cell. In these embodiments, the UE 502 may release of the source radio connection 507 by releasing the source radio connection 507 with the source access node 503 in accordance with the received configuration data.

Figure 7:
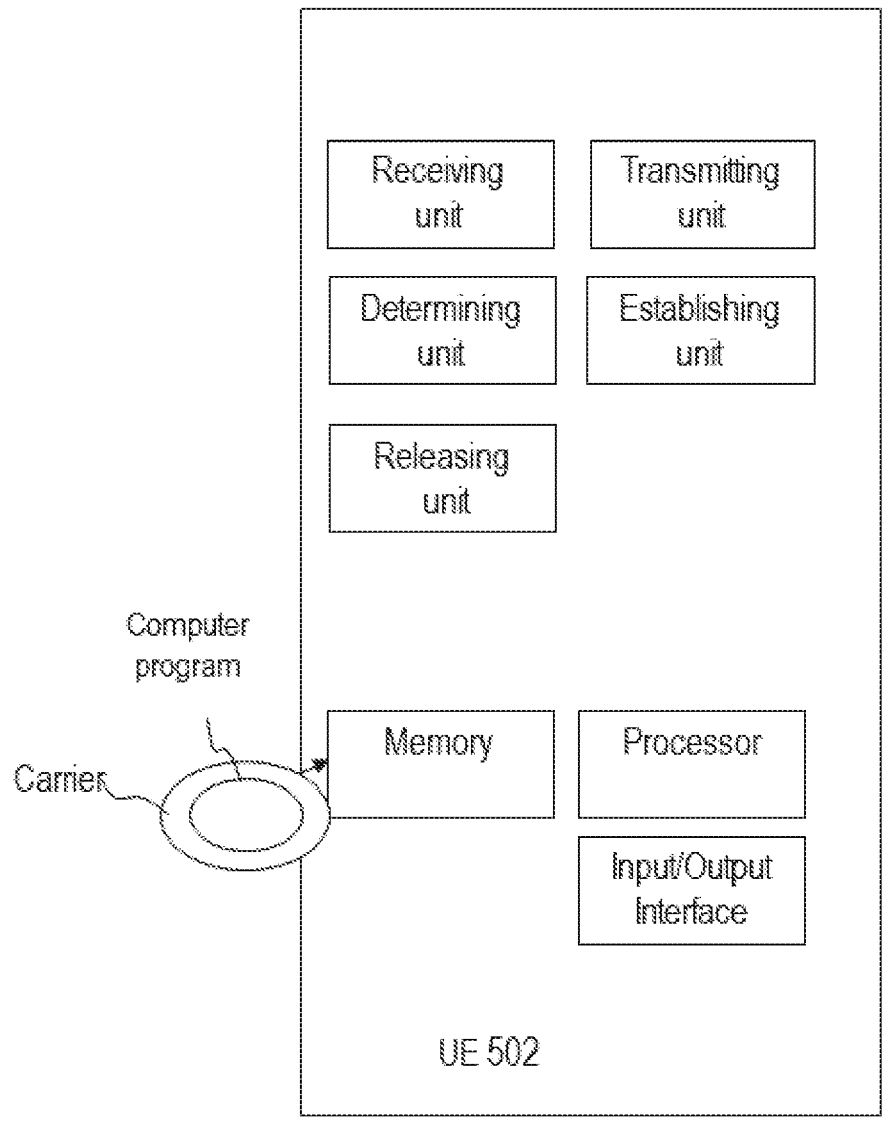
FIG. 7 is a schematic block diagram depicting embodiments of a UE.

To perform the method actions e.g. performing handover from the source access node 503 to the target access node 504, the UE 502 may comprise the arrangement depicted in FIG. 7. The UE 502 may e.g. comprise a transmitting unit, a receiving unit, an establishing unit, a determining unit, and a releasing unit.

The UE 502 is adapted to perform handover from a source access node 503 to a target access node 504. The UE 502, the source access node 503 and the target access node 504 are operating in a wireless communications network 500.

The UE 502 is further adapted to, by means of the receiving unit, receive a handover command message from the source access node 503;

The UE 502 is further adapted to, by means of the establishing unit, establish a target radio connection 508 with the target access node 504;

The UE 502 is further adapted to, by means of the determining unit, determine whether or not a source cell release criterion is fulfilled;

The UE 502 is further adapted to, by means of the releasing unit, when the source cell release criterion is determined to be fulfilled, release a source radio connection 507 with the source access node 503.

In some embodiments, the source cell release criterion is determined to be fulfilled when one or more out of the following actions has been performed:

when the UE 502 receives a first data packet from the target access node 504 on the target radio connection 508;

when the UE 502 performing a Radio Link Monitoring, RLM, on the source radio connection 507 with the source access node 503 detects a condition, e.g. a radio link failure, on the source radio connection 507;

when the UE 502 receives a message from either the source access node 503 or the target access node 504, which message instructs or triggers the UE 502 to release the source radio connection 507 with the source access node 503; and/or when the UE 502 receives confirmation from the target access node 504 about successful reception of an uplink transmission performed in the target cell.

The UE 502 may further be adapted to, start a timer, e.g. a time period, upon reception of the handover command message from the source access node 503.

In some embodiments, the source cell release criterion is determined to be fulfilled upon expiry of the timer, e.g. upon expiry or lapse of the time period.

In some embodiments, the receiving unit is further adapted to receive, from the source access node 503, configuration data instructing the UE 502 to apply one source cell release criterion out of a set of possible source cell release criteria or to apply a subset of source cell release criteria out of the set of possible criteria for triggering release of the source cell.

In some embodiments, the releasing unit is further adapted to release 604 the source radio connection 507 by releasing the source radio connection 507 with the source access node 503 in accordance with the received configuration data.

Those skilled in the art will also appreciate that the units in the UE 502 described above may refer to a combination of analogue and digital circuits, and/or one or more processors configured with software and/or firmware, e.g. stored in the UE 502, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

The UE 502 may comprise an input and output interface configured to communicate with one or more network nodes, e.g. with one or more of the access nodes 503,504. The input and output interface may comprise a wireless receiver (not shown) and a wireless transmitter (not shown).

The embodiments herein may be implemented through a respective processor or one or more processors, such as the processor of a processing circuitry in UE 502 depicted in FIG. 7, together with respective computer program code for performing the functions and actions of the embodiments herein. The program code mentioned above may also be provided as a computer program product, for instance in the form of a data carrier carrying computer program code for performing the embodiments herein when being loaded into the UE 502. One such carrier may be in the form of a CD ROM disc. It is however feasible with other data carriers such as a memory stick. The computer program code may furthermore be provided as pure program code on a server and downloaded to the UE 502.

The UE 502 may further comprise a memory comprising one or more memory units. The memory comprises instructions executable by the processor in the UE 502.

The memory is arranged to be used to store e.g. data, configurations, and applications to perform the methods herein when being executed in the UE 502.

Some embodiments of the UE 502 may comprise:

a radio circuitry configured to determine/receive a handover command message from the source access node 503 and to establish a radio connection with the target access node 504;

a storage configured to store e.g. one or more source cell release criteria, information relating to the source access node 503 and/or the target access node 504;

and a processing unit configured to determine whether or not a source cell criterion is fulfilled.

Embodiments herein will now be further explained and exemplified and may be combined with embodiments as described above in any suitable way.

Some Examples of Source Cell Release Criteria

One example of a source cell release criterion is when the UE 502 receives the first data packet from the target access node 504 on the target radio connection 508. As one example of a first data packet is a PDCP data PDU for a specific data radio bearer received at the PDCP layer, i.e. when it is to be deciphered. In another example, the "first data packet" is an RLC data PDU for a specific data radio bearer. In case no downlink packets are to be sent to the UE 502, the target access node 504 sends a dummy packet to the UE 502, and reception of this dummy packet by the UE 502 is the source cell release criterion.

Another example of a source cell release criterion is expiry of a timer, which may be started when the UE 502 receives the handover command message is action 601.

In yet another example, the source cell release criterion is a combination of reception of the first data packet from the target access node 504 and expiry of a timer. In this example, the UE 502 starts the timer upon reception of the data packet from the target access node 504. At expiry of this timer, the source cell release criterion is fulfilled.

In yet another example, the source cell release criterion is when the UE 502 receives a message from either the source access node 503 or the target access node 504, which instructs or triggers the UE 502 to release the source radio connection 507.

In an alternative example, the source cell release criterion comprises that the UE 502 successfully performs an uplink transmission in the target cell. The uplink transmission may comprise e.g.:

The Msg1 transmission (PRACH preamble), which is confirmed with e.g. the Msg2 reception (Random Access Response) or a scheduling grant (also known as UL grant), the Msg3 transmission, which may comprise e.g. an RRC control message (e.g. RRCConnectionReconfigurationComplete or RRCReconfigurationComplete), control information on PDCP, RLC or MAC level such as e.g. the SN Status transfer, uplink Buffer Status Report (BSR), Power Headroom Report (PHR) or the UE identity (C-RNTI), uplink user data or NAS control signalling.

Transmission of a specific control message, control element or uplink data, which is transmitted separately from the Msg3.

The confirmation of the successful reception, and thus the release condition, may comprise that the target access node 504 sends an acknowledgement on e.g. MAC level (an HARQ ACK), on RLC level (absence of corresponding RLC NACK), PDCP level or on RRC level (e.g. as part of an RRC procedure) or at PHY/L1 level (a scheduling grant, also known as UL grant).

In yet another alternative, two timers are introduced, whose purpose is to take care of cases where there is an interruption in the DL data flow (not caused by the handover but by variations in the flow of DL packets in general, e.g. due to variations in the packet transmissions from remote end nodes or because of variations in the routing delay). A first timer would be started upon UE 502 transmission of the HandoverComplete message (i.e. RRCConnectionReconfigurationComplete in LTE or RRCReconfigurationComplete in NR) or the message 3 in the random access procedure towards the target access node 504. When this first timer expires, the source cell release criterion is fulfilled. If, while the first timer is running, the UE 502 receives a DL data packet, it will start a second timer. At this point there are two possible variants of this alternative:

1. The UE source cell release criterion is fulfilled when either the first timer or the second timer expires or (optionally) when an explicit request to release the source radio connection 507 is received.
2. The UE source cell release criterion is fulfilled when the second timer expires or (optionally) when an explicit request to release the source radio connection 507 is received. When the second timer is started, the already running first timer is stopped and/or ignored. Note that this is equivalent to using only the second timer which is started upon UE 502 transmission of the HandoverComplete message and, unless it expires before that, is restarted when the UE 502 receives a DL data packet.

In yet another embodiment, only expiry of the above-described first timer is used as the source cell release criterion. There may still be an option to transmit an explicit request to the UE to release the source radio connection 507 from the source access node 103 prior to the expiration of the first timer.

In yet another embodiment, only the above-described first timer is used and the source cell release criterion is fulfilled when this timer expires or when the first DL data packet is received from the target access node 508 (whichever comes first). If a DL data packet is received, the UE 502 may stop or discard the running first timer.

In all the above embodiments wherein a first DL data packet from the target access node 108 may trigger either start of a timer or the fulfillment of source cell release criterion with the source access node 503, this may be generalized to be valid for any type of (first) DL packet from the target access node 504, either Control Plane (CP) or User Plane (UP). In yet another alternative, the release condition is when the Radio Link Monitoring (RLM) on the source radio connection 507 with the source access node 503 triggers a radio link failure condition on the source radio connection 507, or any other condition detected by the radio link monitoring. This radio link monitoring, during an enhanced make-before-break handover, may be different from the radio link monitoring on the radio connection to the access node when no handover is in progress. For example, it may be configured to react faster or slower on out-of-sync indications than during "normal" radio link monitoring. Or for example, in the handover command message received in action 601, the network may include parameters to control radio link monitoring of the source radio connection 507.

Yet another possibility is to use a combination of any subset of the above criteria or all of the above criteria and combined them to a logic expression using Boolean algebra with Boolean OR in between (i.e. the UE 502 releases the source cell if criterion-1 OR criterion-2 OR criterion-3 . . . is fulfilled), or using Boolean algebra with Boolean AND in between, or a combination of OR and AND. Another way of expressing this, in the case of Boolean OR is that the UE 502 releases the source cell when the first of criterion-1, criterion-2 and criterion-3 . . . is fulfilled. Again, this may be applied per bearer or for all bearers together.

In the handover command message in action 601, the source access node 503 may also include a parameter which is used to control the source cell release criterion used by the UE 502. For example, the parameter may be a value of a timer, or timers, later used by the UE 502, in case of the source cell release criterion uses timer or timers. In another example, this parameter may indicate which source cell release criterion or set of source cell release criteria out of a given set of possible source cell release criteria that is to be used by the UE 502. For example, this parameter may indicate whether the UE 502 shall use a timer or wait for the first received data packet from the target access node 503, or a combination of both. The source of this configuration information may be the source access node 503, which may include it in the message, or the target access node 504, which may include it in the configuration data container passed to the source access node 503 in the Handover Request Acknowledge message and forwarded to the UE 502 by the source access node 503. Yet another possibility is that the source access node 503 sends the source cell release criterion/criteria configuration to the target access node 504 in the Handover Request message and the source access node 504 includes it in the configuration data container passed to the source access node 503 in the Handover Request Acknowledge message which is then forwarded to the UE 502 by the source access node 503.

Another possible means for configuration of the source cell release criterion/criteria is that the configuration information is comprised in the system information that is broadcast or provided on-demand in the source cell.

As explained in section 1.1.2 Mobility in RRC_CONNECTED in LTE ad NR above, the source access node 503 and the target access node 504 in some alternative embodiments described above refer to roles served by access nodes during handover of the UE 502. In some cases, such as intra-node handover or intra-cell handover, both roles of the source and target access nodes are served by the same access node.

Below a more detailed description will follow.

Embodiments disclosed herein may be separated into different parts which will be described in more detail below.

Some example Embodiments numbered 1-6 are described below.

The following embodiments refer among other things to FIG. 5, FIG. 6, and FIG. 7.

Embodiment 1. A method performed by a UE (502) to perform handover from a source access node (503) to a target access node (504), wherein the UE (502), the source access node (503) and the target access node (504) are operating in a wireless communications network (500), and wherein the method comprises:
  receiving (601) a handover command message from the source access node (503);
  establishing (602) a target radio connection (508) with the target access node (504);
  determining (603) whether or not a source cell release criterion is fulfilled;
  when the source cell release criterion is determined to be fulfilled, releasing (604) a source radio connection (507) with the source access node (503).

Embodiment 2. The method of Embodiment 1, wherein the source cell release criterion is determined to be fulfilled when one or more out of the following actions has been performed:
  when the UE (502) receives a first data packet from the target access node (504) on the target radio connection (508);
  when the UE (502) performing a Radio Link Monitoring, RLM, on the source radio connection (507) with the source access node (503) detects a condition, e.g. a radio link failure, on the source radio connection (507);
  when the (UE 502) receives a message from either the source access node (503) or the target access node (504), which message instructs or triggers the UE (502) to release the source radio connection (507) with the source access node (503); and/or
  when the UE (502) receives confirmation from the target access node (504) about successful reception of an uplink transmission performed in the target cell.

Embodiment 3. The method of Embodiment 1 or 2, further comprising:'
  starting a timer, e.g. a time period, upon reception of the handover command message from the source access node (503).

Embodiment 4. The method of Embodiment 3, wherein the source cell release criterion is determined to be fulfilled upon expiry of the timer, e.g. upon expiry or lapse of the time period.

Embodiment 5. The method of any of Embodiments 1-4, further comprising:
  receiving, from the source access node (503), configuration data instructing the UE (502) to apply one source cell release criterion out of a set of possible source cell release criteria or to apply a subset of source cell release criteria out of the set of possible criteria for triggering release of the source cell.

Embodiment 6. The method of Embodiment 5, wherein the releasing (604) of the source radio connection (507) comprises:
  releasing the source radio connection (507) with the source access node (503) in accordance with the received configuration data.

Further Extensions and Variations

Figure 8:
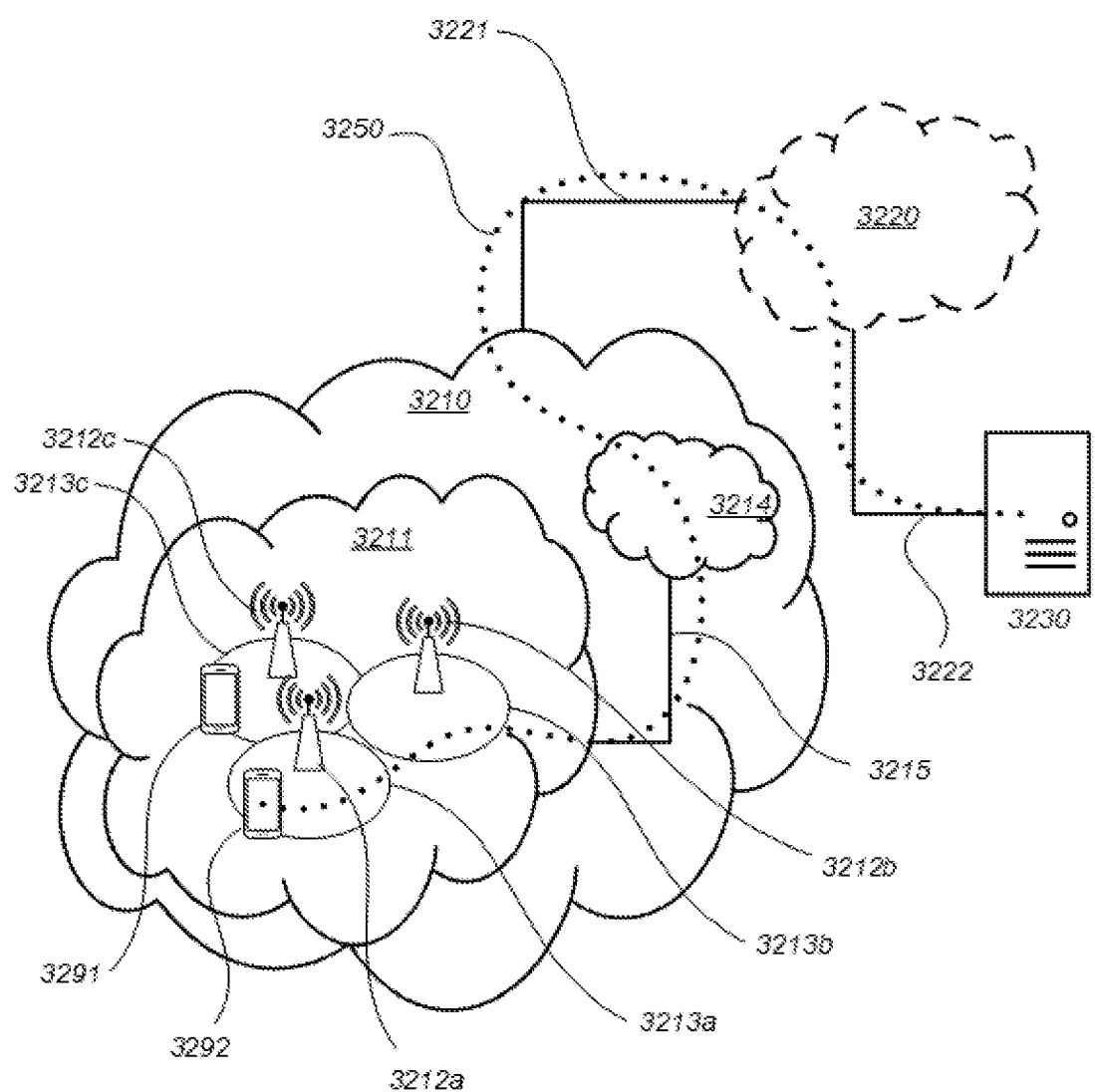
FIG. 8 schematically illustrates a telecommunication network connected via an intermediate network to a host computer.

With reference to FIG. 8, in accordance with an embodiment, a communication system includes a telecommunication network 3210 such as the wireless communications network 500, e.g. a WLAN, such as a 3GPP-type cellular network, which comprises an access network 3211, such as a radio access network, and a core network 3214. The access network 3211 comprises a plurality of base stations 3212*a*, 3212*b*, 3212*c*, such as network nodes 503, 504, access nodes, AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) e.g. the UE 502 such as a Non-AP STA 3291 located in coverage area 3213*c* is configured to wirelessly connect to, or be paged by, the corresponding base station 3212*c*. A second UE 3292 such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 8 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signalling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 9. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 9:
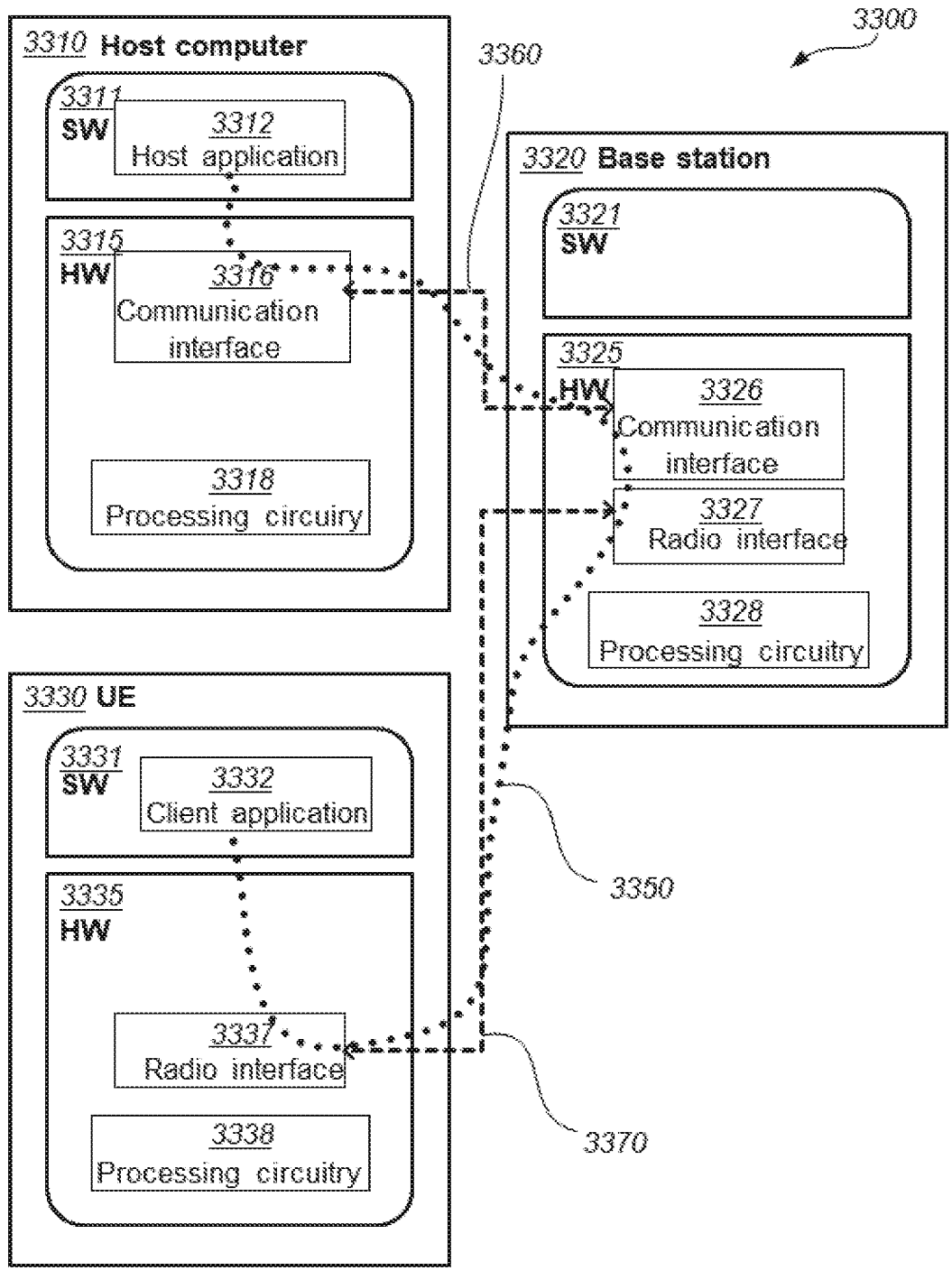
FIG. 9 is a generalized block diagram of a host computer communicating via a base station with a user equipment over a partially wireless connection.

It is noted that the host computer 3310, base station 3320 and UE 3330 illustrated in FIG. 9 may be identical to the host computer 3230, one of the base stations 3212a, 3212b, 3212c and one of the UEs 3291, 3292 of FIG. 8, respectively. This is to say, the inner workings of these entities may be as shown in FIG. 9 and independently, the surrounding network topology may be that of FIG. 8.

In FIG. 9, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the pSIM scheduling allowing more positioning assistance data to be broadcasted.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signalling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 10, 11:
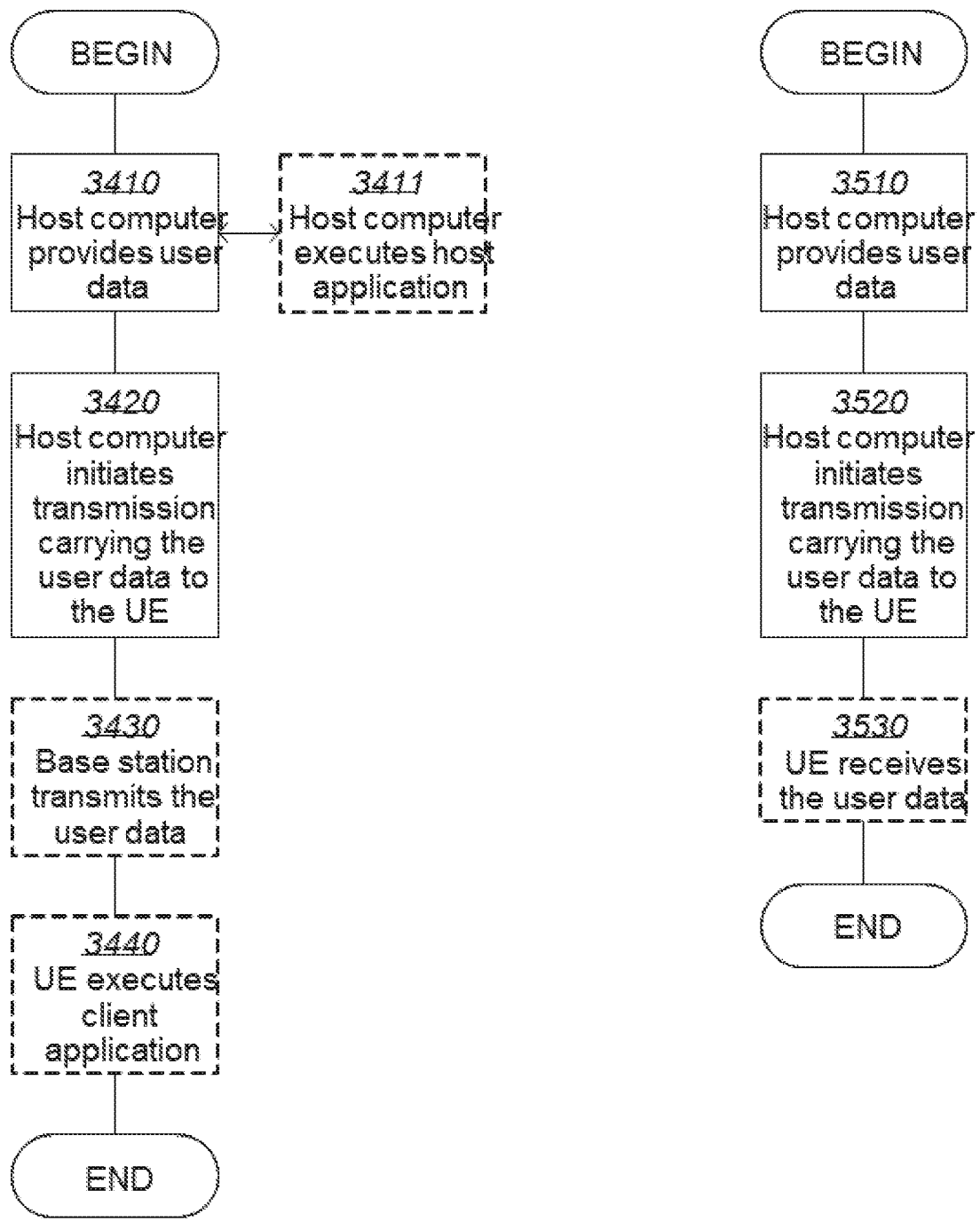
FIGS. 10-13 are flowcharts illustrating methods implemented in a communication system including a host computer, a base station and a user equipment.

FIGS. 8 and 9 and the corresponding text are about a downstream aspect of the radio-related invention, while FIGS. 10 and 11 and the corresponding text discuss an upstream aspect.

FIG. 10 is a flowchart illustrating a method implemented in a communication system, in accordance with one embodiment. The communication system includes a host computer, a base station such as a AP STA, and a UE such as a Non-AP STA which may be those described with reference to FIGS. 8 and 9. For simplicity of the present disclosure, only drawing references to FIG. 8 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 11 is a flowchart illustrating a method implemented in a communication system, in accordance with one embodiment. The communication system includes a host computer, a base station such as a AP STA, and a UE such as a Non-AP STA which may be those described with reference to FIGS. 8 and 9. For simplicity of the present disclosure, only drawing references to FIG. 11 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figures 12, 13:
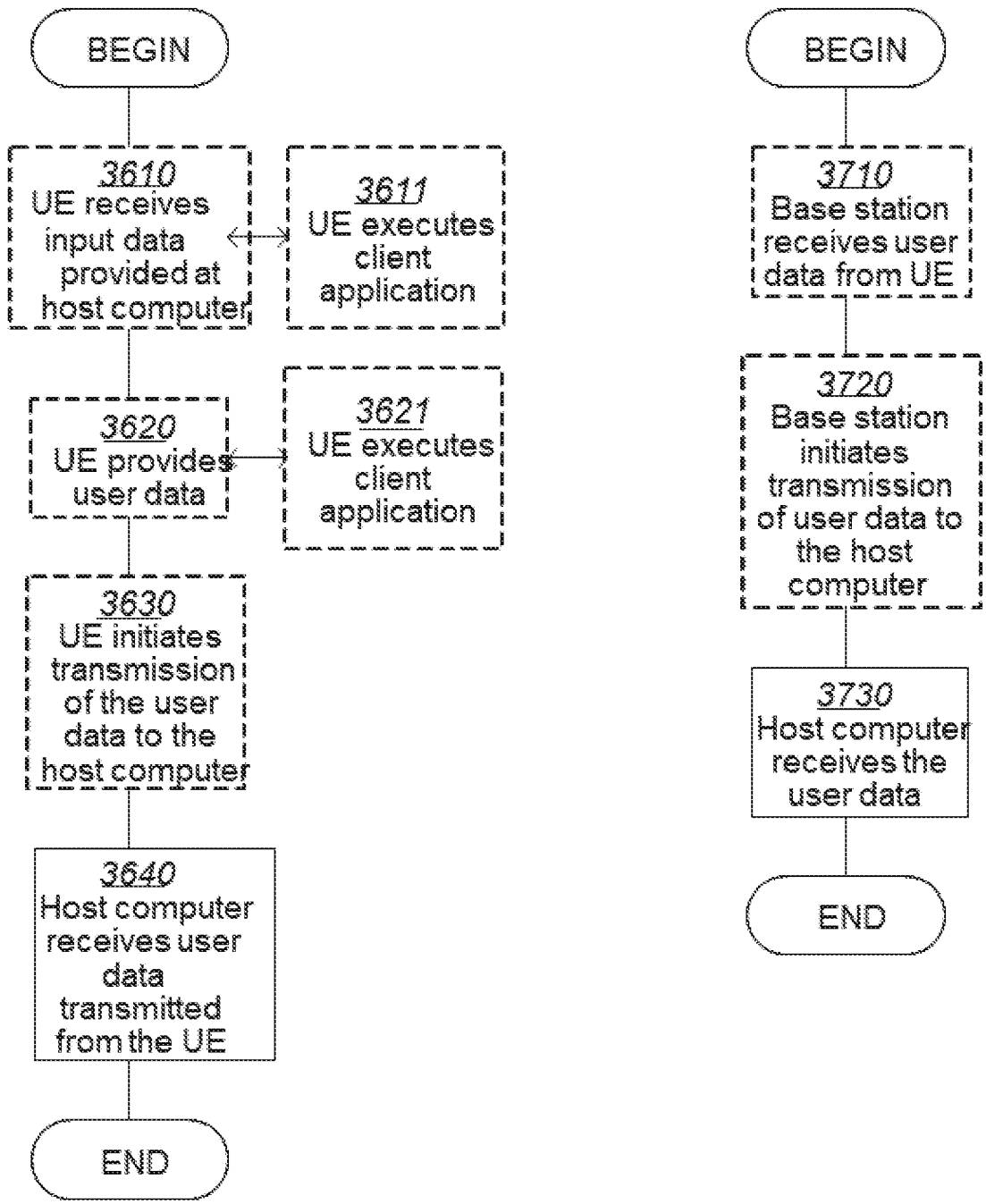

FIG. 12 is a flowchart illustrating a method implemented in a communication system, in accordance with one embodiment. The communication system includes a host computer, a base station such as a AP STA, and a UE such as a Non-AP STA which may be those described with reference to FIGS. 8 and 9. For simplicity of the present disclosure, only drawing references to FIG. 12 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station such as a AP STA, and a UE such as a Non-AP STA which may be those described with reference to FIGS. 8 and 9. For simplicity of the present disclosure, only drawing references to FIG. 13 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

| Abbreviation | Explanation |
| --- | --- |
| 5GS | 5 G System |
| 5GC | 5 G Core network |
| AMF | Access and Mobility Management Function |
| CHO | Conditional Handover |
| CP | Control Plane |
| C-RNTI | Cell RNTI |
| DL | Downlink |
| eNB | Evolved Node B |
| E-UTRAN | Evolved Universal Terrestrial Access Network |
| EPC | Evolved Packet Core network |
| gNB | 5 G Node B |
| HO | Handover |
| LTE | Long-term Evolution |
| MBB | Make-before-break |
| NCC | Next Hop Chaining Counter |

| Abbreviation | Explanation |
| --- | --- |
| NG-RAN | Next Generation Radio Access Network |
| NR | New Radio |
| PDCP | Packet Data Convergence Protocol |
| PHY | Physical layer (also known as Layer 1/L1) |
| RA | Random Access |
| RAR | Random Access Response |
| RLM | Radio Link Monitoring |
| RNTI | Radio Network Temporary Identifier |
| RRC | Radio Resource Control |
| Rx | Receive |
| SDU | Service Data Unit |
| SN | Sequence Number |
| Tx | Transmit |
| UE | User Equipment |
| UL | Uplink |
| UP | User Plane |
| UPF | User Plane Function |

The invention claimed is:

1. A method performed by a User Equipment, UE, to perform handover from a source access node to a target access node, wherein the UE, the source access node and the target access node are operating in a wireless communications network, and wherein the method comprises:
receiving a handover command message from the source access node and starting a first timer, upon reception of the handover command message from the source access node;
establishing a target radio connection with the target access node;
while the first timer is running, receiving a downlink data from the target radio connection;
starting a second timer in response to receiving the downlink data from the target radio connection;
determining whether or not a source cell release criterion is fulfilled, wherein the source cell release criterion is determined to be fulfilled upon expiry of the second timer;
when the source cell release criterion is determined to be fulfilled, releasing a source radio connection with the source access node.

2. The method of claim 1, wherein the source cell release criterion is determined to be fulfilled when one or more out of the following actions has been performed:
when the UE receives a first data packet from the target access node on the target radio connection;
when the UE performing a Radio Link Monitoring, RLM, on the source radio connection with the source access node detects a condition on the source radio connection;
when the UE receives a message from either the source access node or the target access node, which message instructs or triggers the UE to release the source radio connection with the source access node; and
when the UE receives confirmation from the target access node about successful reception of an uplink transmission performed in the target cell.

3. The method of claim 1, further comprising:
receiving, from the source access node, configuration data instructing the UE to apply one source cell release criterion out of a set of possible source cell release criteria or to apply a subset of source cell release criteria out of the set of possible criteria for triggering release of the source cell.

4. The method of claim 3, wherein the releasing of the source radio connection comprises:
releasing the source radio connection with the source access node in accordance with the received configuration data.

5. A computer program comprising instructions, which when executed by a processor, causes the processor to perform actions according to claim 1.

6. A User Equipment, UE, configured to perform handover from a source access node to a target access node, wherein the UE, the source access node and the target access node are operating in a wireless communications network, and wherein the UE comprises:
a receiving processing circuit configured to receive a handover command message from the source access node, and starting a first timer, upon reception of the handover command message from the source access node;
an establishing processing circuit configured to establish a target radio connection with the target access node;
the receiving processing circuit further configured to while the first timer is running, receive a downlink data from the target radio connection;
a starting processing circuit configured to start a second timer in response to receiving the downlink data from the target radio connection;
a determining processing circuit configured to determine whether or not a source cell release criterion is fulfilled, wherein the source cell release criterion is determined to be fulfilled upon expiry of the second timer;
a releasing processing circuit configured to when the source cell release criterion is determined to be fulfilled, release a source radio connection with the source access node.

7. The UE of claim 6, wherein the source cell release criterion is determined to be fulfilled when one or more out of the following actions has been performed:
when the UE receives a first data packet from the target access node on the target radio connection;
when the UE performing a Radio Link Monitoring, RLM, on the source radio connection with the source access node detects a condition, on the source radio connection;
when the receives a message from either the source access node or the target access node, which message instructs or triggers the UE to release the source radio connection with the source access node; and
when the UE receives confirmation from the target access node about successful reception of an uplink transmission performed in the target cell.

8. The UE claim 6, wherein the receiving processing circuit further is configured to:
receive, from the source access node, configuration data instructing the UE to apply one source cell release criterion out of a set of possible source cell release criteria or to apply a subset of source cell release criteria out of the set of possible criteria for triggering release of the source cell.

9. The UE of claim 8, wherein the releasing processing circuit further is configured to release the source radio connection by:
releasing the source radio connection with the source access node in accordance with the received configuration data.

* * * * *